(12) United States Patent
Kim et al.

(10) Patent No.: US 7,489,091 B2
(45) Date of Patent: Feb. 10, 2009

(54) BACKLIGHT UNIT FOR LIQUID CRYSTAL DISPLAY DEVICE

(75) Inventors: Pu Jin Kim, Gyeongsangbuk-Do (KR); Jae Ho Lee, Daegu (KR); Yong Kon Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/165,464

(22) Filed: Jun. 24, 2005

(65) Prior Publication Data
US 2006/0001386 A1  Jan. 5, 2006

(30) Foreign Application Priority Data
Jun. 30, 2004 (KR) ............ 10-2004-0050853

(51) Int. Cl.
*H05B 37/00* (2006.01)
(52) U.S. Cl. ............ 315/324; 315/312; 315/178; 315/192; 315/185 S
(58) Field of Classification Search ............ 315/209 R, 315/210, 291, 299, 307, 312–326, 185 S, 315/200 A; 349/56, 58
See application file for complete search history.

(56) References Cited

U.S. PATENT DOCUMENTS

| | | | | |
|---|---|---|---|---|
| 6,420,839 B1 * | 7/2002 | Chiang et al. | ............ | 315/311 |
| 6,515,427 B2 * | 2/2003 | Oura et al. | ............ | 315/141 |
| 6,534,927 B1 * | 3/2003 | Takaoka | ............ | 315/224 |
| 6,534,934 B1 * | 3/2003 | Lin et al. | ............ | 315/312 |
| 6,880,947 B2 * | 4/2005 | Hsieh et al. | ............ | 362/614 |
| 6,970,226 B2 * | 11/2005 | Yu et al. | ............ | 349/161 |
| 7,002,304 B2 * | 2/2006 | Chan et al. | ............ | 315/282 |
| 7,030,568 B2 * | 4/2006 | Boke et al. | ............ | 315/224 |
| 2002/0097004 A1 | 7/2002 | Chiang et al. | ............ | 315/224 |
| 2005/0218827 A1 * | 10/2005 | Ushijima et al. | ............ | 315/224 |
| 2006/0091819 A1 * | 5/2006 | Li et al. | ............ | 315/209 R |
| 2007/0093165 A1 | 4/2007 | Komatsu et al. | | |

FOREIGN PATENT DOCUMENTS

| | | | |
|---|---|---|---|
| JP | 2005-063941 | 3/2005 | |
| JP | 2005-322479 | 11/2005 | |

* cited by examiner

*Primary Examiner*—Tuyet Vo
(74) *Attorney, Agent, or Firm*—McKenna Long & Aldridge LLP

(57) ABSTRACT

A backlight unit includes: a plurality of cold cathode fluorescent lamps; a plurality of capacitors respectively connected to both ends of each of the cold cathode fluorescent lamps, the capacitors having respective impedance that are selected to allow the same amount of current to flow through each of the plurality of the cold cathode fluorescent lamps; and an inverter connected to the capacitors of the cold cathode fluorescent lamps.

3 Claims, 4 Drawing Sheets

BACKLIGHT UNIT FOR LIQUID CRYSTAL DISPLAY DEVICE

The present invention claims the benefit of Korean Patent Application No. 2004-50853 filed in Korea on Jun. 30, 2004, which is hereby incorporated by reference.

BACKGROUND OF THE INVENTION

1. Field of the Invention

The present invention relates to a backlight unit (BLU), and particularly, to a backlight unit for a liquid crystal display device including cold cathode fluorescent lamps.

2. Discussion of the Related Art

Presently, display devices serve as very important visual information transfer mediums. Display devices must be light weight, thin and small to play a key role for future applications. Display devices can be categorized into different types. One type is the luminescent type that produces light by themselves, such as cathode ray tube (CRT) devices, electro-luminescent (EL) displays, light emitting diode (LED) devices, vacuum fluorescent display (VFD) devices, field emission display (FED) devices, and plasma display panel (PDP) devices. Another type is the non-luminescent type that cannot produce light by themselves, such as liquid crystal display (LCD) devices.

The LCD devices draw great attention as one of the next generation display devices along with PDP devices and EL displays. Images are displayed on LCD devices by making use of optical anisotropy of liquid crystals together with a backlight. As a result, a liquid crystal display can have a high level of visibility, low average power consumption and only releases a small amount of heat in comparison with an existing cathode ray tube (CRT) having the same size screen.

In LCD devices, the liquid crystals do not emit light, but receive, modulate and transmit light through a display panel. More specifically, data signals in accordance with image information are individually supplied to pixels arranged in a matrix configuration on the LCD panel such that light transmittances of the pixels are controlled to display the desired images. Accordingly, the LCD device requires a light source, such as a backlight unit, to irradiate light onto an LCD panel.

The LCD device has a liquid crystal display panel for providing an image that includes an array substrate, a color filter substrate, and liquid crystal injected between the two substrates. A backlight unit installed at the rear of the LCD panel emits light toward the entire front of the LCD panel. A plurality of case elements couple the LCD panel to the backlight unit. In the LCD panel, a pixel electrode on the array substrate and a common electrode on the color filter substrate are formed to apply an electric field across the liquid crystal layer. If a voltage of the data signal supplied to the pixel electrode is controlled such that the voltage is applied across the liquid crystal layer to the common electrode, the liquid crystals of the liquid crystal layer rotate by dielectric anisotropy along the electric field between the common electrode and the pixel electrode. Thus, light is transmitted or blocked by each pixel according to the rotation of the liquid crystal, such that characters or images are displayed.

The backlight unit 20 functions to provide planar light having uniform brightness from a fluorescent lamp 43 used as a light source. The thickness and power consumption of the LCD device is dependent upon the profile thickness and light efficiency of the backlight unit 20. In general, there are two types of backlight units. The first type of backlight is the direct type backlight in which a fluorescent lamp is positioned at the rear surface of the LCD panel to transmit light directly to the LCD panel. The second type of backlight is the edge type backlight in which a fluorescent lamp is positioned at one side or both sides of the LCD panel and light is reflected, diffused and concentrated by a light guide plate, a reflection sheet and other sheets to transmit light to the LCD panel.

The edge type backlight can be easily fabricated. Further, the edge type backlight typically has a profile thinner than the direct type backlight. However, light can be more readily distributed in a large LCD device with a direct type.

A cold cathode fluorescent lamp (CCFL) is commonly used as a light source in the backlight unit. The CCFL can easily be used in the edge type backlight but can not be used in the direct type backlight unit. This is because the CCFL is installed with a method in which soldering is performed between a lamp electrode and a lamp wire, and a silicon rubber covering is positioned to encompass the soldered portion. When the CCFL is used for the direct type backlight unit provided with several lamps, it takes a long time to perform the several individual installations of the lamps by means of soldering and silicon rubber coating. In other words, individual soldering of the CCFL is impractical as an integral type lamp holder is usually used for direct type backlight unit.

A related art CCFL and method of driving will now be described in detail with reference to FIGS. 1A, 1B, 2A, 2B.

FIGS. 1A and 1B are schematic views of a related art CCFL and a driving method thereof. As shown in FIGS. 1A and 1B, a high voltage is applied across the CCFL 40A via the internal electrodes 41 arranged at both ends of a CCFL 40A, and the voltage is raised up to a starting voltage which enables current to flow through the CCFL 40A. When the voltage exceeds the starting voltage, light emission occurs in the CCFL 40A. Then, a continuous emission of light is maintained by applying an alternating current (AC) to the CCFL 40A.

In the edge type backlight, the operation is only for one CCFL 40A. The operation would have to be individually performed as frequently as the number of CCFLs in the direct type backlight unit. Accordingly, a backlight unit employing the CCFL is usually only fabricated as an edge type. External electrode florescent lamps (EFFLs) are usually used for the direct type backlight unit.

FIGS. 2A and 2B are schematic views of a related art external electrode florescent lamp and a driving method thereof. Unlike the CCFL, an EEFL 40B has no internal electrodes or electrodes that protrude inwardly at both ends of a glass tube. A conductive material is applied on both ends of the EEFL 40B. The EEFL 40Bb emits light by a driving method in which ions polarized by the electric field change created by external electrodes 42 gather at both ends according to their polarities and then are recombined at the point of the zero crossing due to a high-voltage AC.

Because the electrodes of an EEFL are external, an equivalent circuit of set of EEFLs is a set of parallel capacitors. Accordingly, several EEFLS 40B may be driven in parallel. Once a parallel set of EEFLs is provided with a voltage inverter of sufficient capacity, the EEFLs may emit light with a simpler structure and a simpler inverter in comparison to the structure and inverter that would be necessary to drive a set of CCFLs. However, the EEFL obtains a sufficiently high brightness level by a high-frequency driving of at least a few MHz. The high-frequency driving of the EEFL causes problems, such as electro-magnetic interference due to the high frequency, low efficiency as well as disadvantages associated with a high frequency power supplying unit.

SUMMARY OF THE INVENTION

Accordingly, the present invention is directed to a backlight unit for a liquid crystal display device that substantially obviates one or more of the problems due to limitations and disadvantages of the related art.

An object of the present invention is to provide a backlight unit and an LCD device using the same that can drive a plurality of lamps in parallel.

Another object of the present invention is to provide a backlight unit and an LCD device using the same that reduce variations in the amount of current flowing through a parallel set of lamps.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a backlight unit including: a plurality of cold cathode fluorescent lamps; a plurality of capacitors respectively connected to both ends of each of the cold cathode fluorescent lamps, the capacitors having respective impedance that are selected to allow the same amount of current to flow through each of the plurality of the cold cathode fluorescent lamps; and an inverter connected to the capacitors of the cold cathode fluorescent lamps.

In another aspect, a liquid crystal display device includes: a liquid crystal display panel; a plurality of fluorescent lamps for emitting light to the liquid crystal display panel; a plurality of capacitors respectively connected to both ends of each of the fluorescent lamps connected to the plurality of fluorescent lamps, wherein a first set of capacitors with capacitances different from those for other fluorescent lamps are connected to both ends of a first fluorescent lamp; and a lamp housing positioned behind the plurality of fluorescent lamps for encompassing and receiving the fluorescent lamps.

In another aspect, a backlight unit includes: a liquid crystal display panel; a plurality of cold cathode fluorescent lamps for emitting light to the liquid crystal display panel; a plurality of capacitors respectively connected to both ends of each of the cold cathode fluorescent lamps; an inverter connected to the capacitors of the cold cathode fluorescent lamps; a lamp housing positioned behind the plurality of cold cathode lamps for encompassing and receiving the cold cathode fluorescent lamps.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1A:
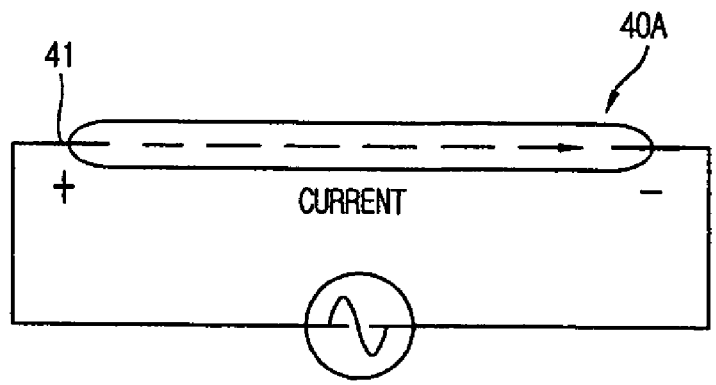
FIGS. 1A and 1B are schematic views of a related art cold cathode fluorescent lamp and a driving method thereof.
Figure 1B:
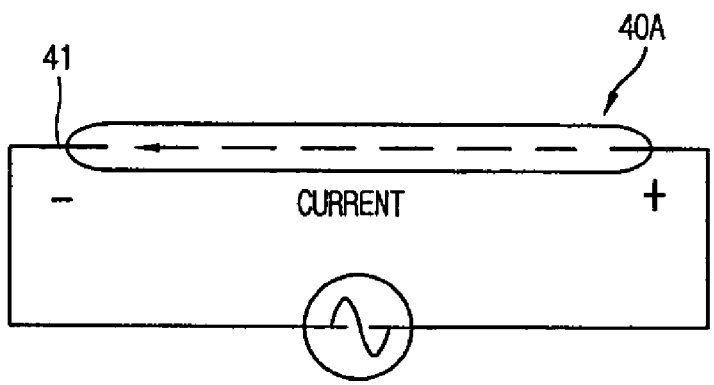
Figure 2A:
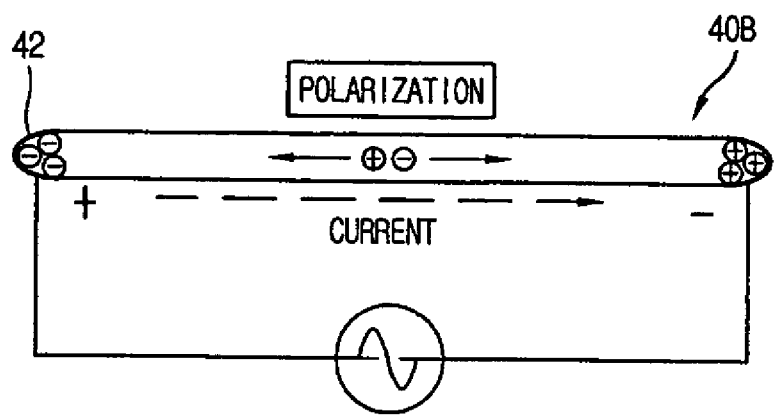
FIGS. 2A and 2B are schematic views of a related art external electrode florescent lamps and a driving method thereof.
Figure 2B:
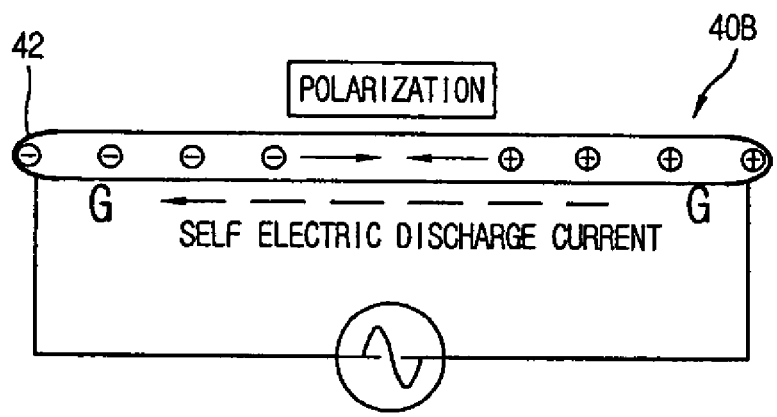
Figure 3:
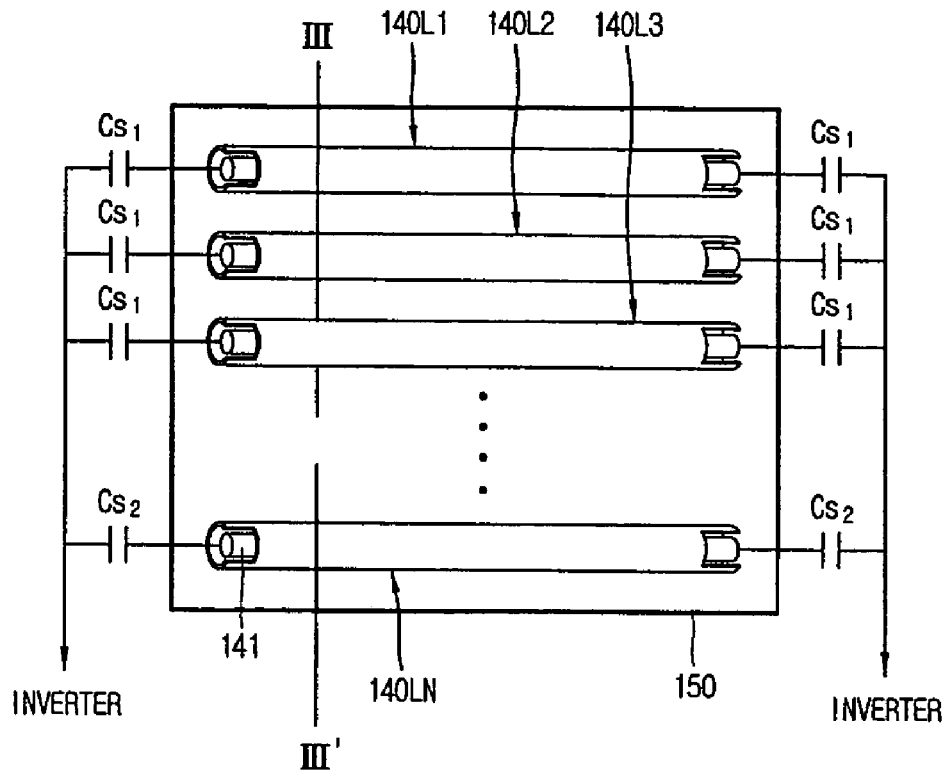
FIG. 3 is a schematic view of a backlight unit in accordance with a first exemplary embodiment of the present invention.

FIG. 3 is a schematic view of a backlight unit in accordance with a first exemplary embodiment of the present invention. As shown, the backlight unit in accordance with an embodiment of the present invention includes a plurality of cold cathode fluorescent lamps (CCFLs) 140L1~140LN connected to one another in parallel, a voltage-boosting transformer (not shown), which is a power device for applying an AC voltage to the CCFLs 140L1~140LN to drive them, and a lamp housing 150 positioned under the plurality of CCFLs 140L1~140LN and encompassing them.

In the first exemplary embodiment of the present invention, an arrangement of external electrode fluorescent lamps (EEFLs) has been developed to address the aforementioned problems, such as the electro-magnetic interference caused by the high driving frequency, low efficiency, and the like. Further, an arrangement of EEFLs has been developed that addresses the problem of low brightness and low efficiency when an EEFL is driven with an LC-resonant inverter. In an exemplary embodiment of the present invention, at least two types of high voltage capacitors $C_{S1}$ and $C_{S2}$ are respectively attached to both ends of a CCFL, so that the CCFL together with the capacitors has qualitatively somewhat similar equivalent circuit structure as that of an EEFL.

Namely, if the EEFL is drawn as an equivalent circuit, it can be seen that the EEFL has a structure of a capacitor+a resistor+a capacitor. This structure is different from that of the equivalent circuit of the related art CCFL, which is just a resistor. In other words, capacitors exist in series at both ends of the EEFL in the equivalent circuit of the EEFL and the equivalent circuit of the CCFL does not have any capacitors. If the CCFLs are driven in parallel, it is difficult to obtain uniform brightness because of an inconsistent distribution of current densities amongst the CCFLs. Therefore, capacitors are attached to both ends of the CCFL to form qualitatively somewhat similar equivalent circuit as the EEFL. The above-described CCFLs together with the capacitors enables the use of a simplified inverter and lower production costs.

If the CCFLs are driven without the capacitors $C_{S1}$ and $C_{S2}$, more current flows rapidly to any lamp having a relatively lower resistance among the CCFLs 140L1~140LN connected in parallel, which undesirably negates the effect of driving the CCFLs in parallel. As described, in the above exemplary embodiment of the present invention, capacitors $C_{S1}$ or $C_{S2}$ are respectively connected to both ends of each of the CCFLs 140L1~140LN such that a plurality of lamps can be driven in parallel. Capacitors $C_{S2}$ have capacitances that are different from those of the other capacitors $C_{S1}$ connected to CCFLs 140C1~140CN-1. Capacitors $C_{S2}$ are attached to both ends of the last CCFL 140CN. This aspect will be described in more detail below.

In the first exemplary embodiment of the present invention, a backlight unit of a large LCD device has a plurality of fluorescent lamps driven in parallel. Since the plurality of lamps are driven together, uniform brightness of the backlight is mainly affected by the current flowing through the lamps. For example, sixteen lamps are arranged in parallel in a 30 inch backlight unit. The number of lamps increases as the size (inches) of the backlight unit increases.

Figure 4:
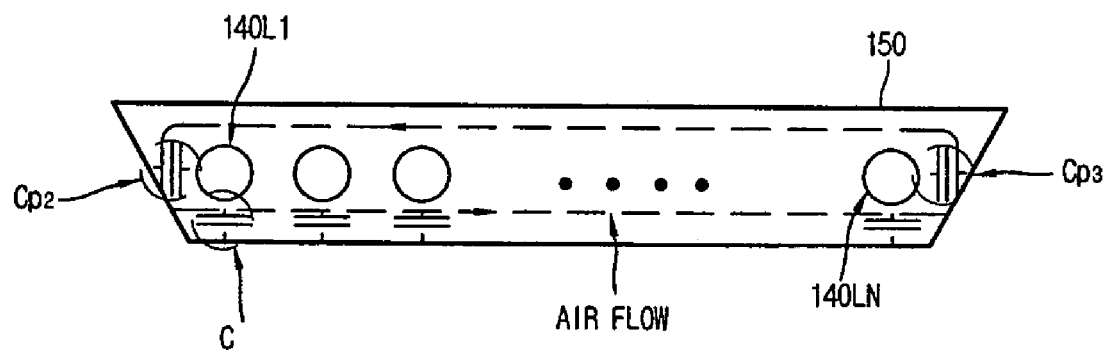
FIG. 4 is a cross-sectional view illustrating a cross-section cut along line III-III' of the backlight unit shown in FIG. 3.

FIG. 4 is a cross-sectional view illustrating a cross-section cut along line III-III' of the backlight unit shown in FIG. 3. When a current flowing through each of the CCFLs 140C1~140CN is measured, it can be seen that the smallest amount of current flows through the lowermost CCFL 140CN. The smallest amount of current flows through the CCFL 140CN because of the presence of parasitic capacitances $C_{P1}$~$C_{P3}$ between the lamp system and the lamp housing 150. Electric fields are formed between the lamp system and the lamp housing 150, and the density of the electrical energy that is leaked due to the electric fields is $\mu = \epsilon_0 E^2/2$. Also, as a distance between the CCFLs 140C1~140CN and the lamp housing 150 becomes shorter, the parasitic capacitances $C_{P1}$~$C_{P3}$ between the CCFLs 140C1~140CN and the lamp housing 150 increase, thereby increasing the leakage effect. Thus, as shown in FIG. 4, because the parasitic capacitances $C_{P2}$ and $C_{P3}$ are relatively large at the CCFLs 140C1 and 140CN arranged at both sides of the housing, the amount of current flowing through each of the CCFLs 140C1 and 140CN is made relatively smaller by the leakage effect.

Because an LCD device is driven in a vertically upright orientation in general, a temperature within the backlight unit is relatively higher at its upper portion than at its lower portion. Thus, the current of the CCFL 140L1 arranged at the upper portion may be compensated to a certain degree while a small amount of current will still flow through the CCFL 140LN arranged at the lower portion. Namely, the CCFL 140L1 arranged at the upper portion undergoes the leakage of electricity due to the parasitic capacitance ($C_{P2}$), but the compensation for such leakage is made by the higher temperature of the upper portion having reduced impedance due to heat convection within the lamp system.

The parasitic capacitance causes problems in the uniformity of brightness of the backlight. To avoid such problems, capacitors $C_{S2}$ with capacitances that are different from those of the other CCFLs 14C1~140CN-1 are respectively connected to both ends of the CCFL 140LN arranged at the lower portion. Capacitors $C_{S2}$ have higher impedance than the other capacitors $C_{S1}$. Specifically, the capacitance of the capacitors Cs2 is larger than that of the capacitors Cs1.

Figure 5:
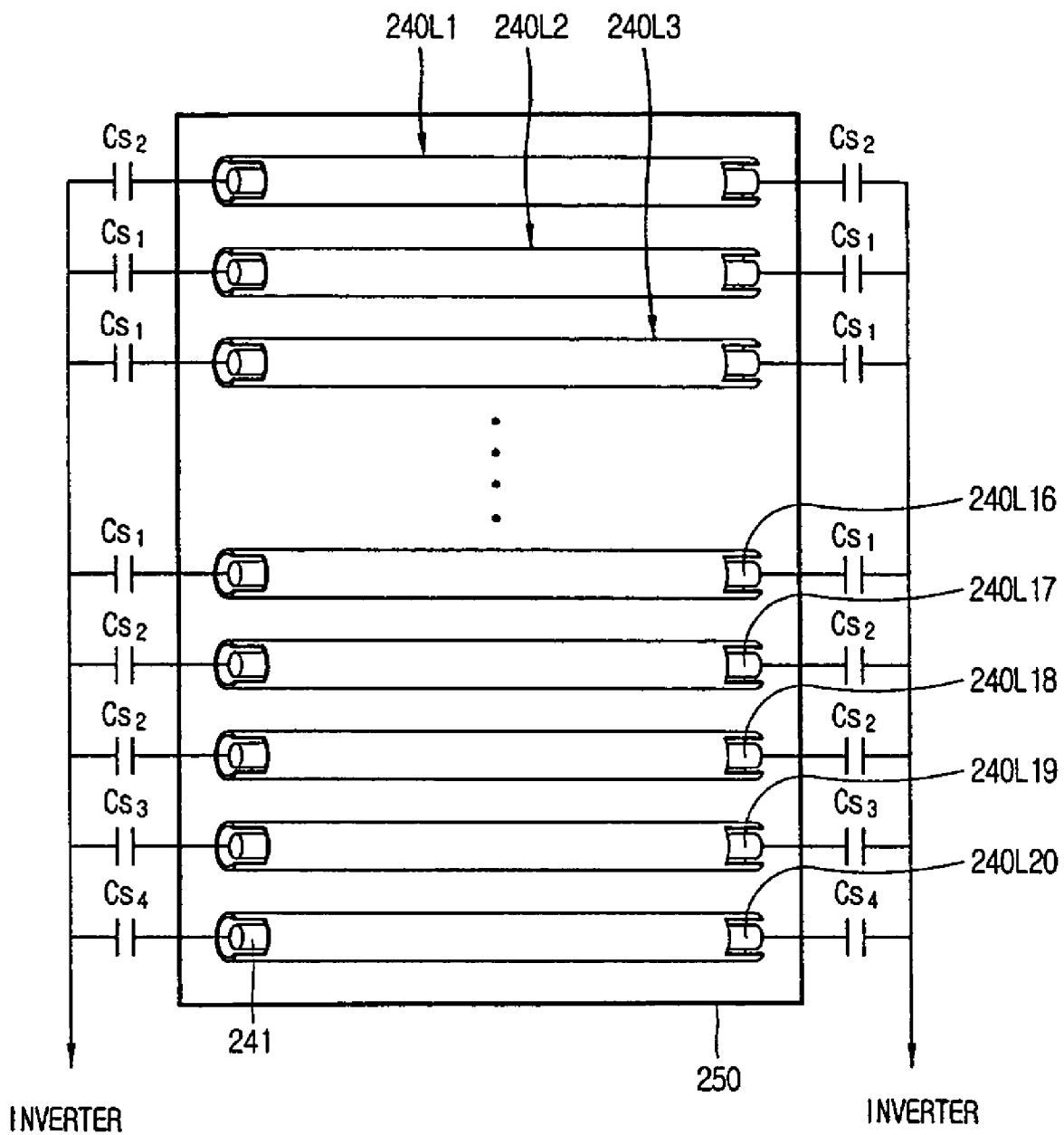
FIG. 5 is a schematic view of a backlight unit in accordance with a second exemplary embodiment of the present invention.

One example of an LCD device employing such a backlight unit in accordance with a second exemplary embodiment of the present invention will now be described. FIG. 5 shows the second embodiment of the present invention. In FIG. 5, 20 lamps 240L1-L20 are provided and the capacitors Cs are connected in series to respective ends of the lamps 240L1-L20. In this embodiment, the capacitors Cs are grouped into four groups Cs1, Cs2, Cs3 and Cs4. The capacitors Cs4 are connected to the lowermost lamp 240L20, the capacitors Cs3 are connected to the second lowermost lamp 240L19, the capacitors Cs2 are connected to the third and fourth lowermost lamps 240L18 and L17 and the uppermost lamp 240L1, and the capacitors Cs1 are connected to the other lamps.

In the second embodiment as well as in the first embodiment, the capacitances of the capacitors Cs are selected taking into account the parasitic capacitance between the lamp and the lamp housing 150 and the temperature convection in the lamp system. That is, the lamp with larger parasitic capacitor requires larger capacitance of the capacitor Cs, and the lamp positioned at higher temperature also requires larger capacitance of the capacitor Cs.

As a result, the relation of the capacitances of the capacitors Cs is Cs4>Cs3>Cs2>Cs1. This relation allows the same amount of current for each lamp in the same principle as the first embodiment, so that the uniform brightness of the backlight is achieved.

The LCD device includes an LCD panel in which pixels are arranged in a matrix configuration, a gate driving circuit unit and a data driving circuit unit respectively connected to side surfaces of the LCD panel, and a backlight unit disposed at the rear surface of the LCD panel. The LCD panel includes an array substrate and a color filter substrate attached together to face each other with a uniform cell gap therebetween. A liquid crystal layer formed between the array substrate and the color filter substrate.

A common electrode on the color filter substrate and a pixel electrode on the array substrate apply an electric field to the liquid crystal layer. If a voltage of a data signal supplied to the pixel electrode is controlled such that the voltage is supplied to the common electrode, liquid crystals of the liquid crystal layer rotate by dielectric anisotropy along the electric field between the common electrode and the pixel electrode. Thus, light is transmitted or blocked by each pixel by the rotation of the liquid crystals, such that characters or images are displayed on the LCD panel.

To control a voltage of the data signal supplied to the pixel electrode by each pixel, each pixel is provided with a switching device, such as a thin film transistor (TFT). The gate driving circuit unit and the data driving circuit unit are coupled to the LCD panel. The gate driving circuit unit supplies scan signals to a plurality of gate lines and the data driving circuit unit supplies image information to a plurality of data lines formed on the LCD panel so as to drive the pixels of the LCD panel.

The backlight unit includes a reflection sheet, a light guide plate, an optical sheet and a lamp assembly that are sequentially stacked and received within a mold frame. The LCD panel and the backlight unit are supported by a bottom cover placed at the rear of the backlight unit. The bottom cover may be coupled to the mold frame with a screw, for example.

In the alternative for the purpose of speedy assembly operation, the bottom cover and the mold frame may be hook-fitted. More specifically, the bottom cover and the mold frame may be coupled together by inserting a hook formed on the mold frame into an insertion groove formed in the bottom cover. In another alternative, the hook may be formed on the bottom cover and the insertion groove may be formed in the mold frame.

A top cover is pressingly attached to an edge of an upper surface of the mold frame coupled to the bottom cover, and the top case may be, for example, screw or hook-coupled to the mold frame.

In the backlight unit in accordance with exemplary embodiments of the present invention, capacitors are connected to both ends of each of the CCFLs so that the equivalent circuit diagram of the CCFLs together with the capacitors is somewhat similar to that of the EEFL. Accordingly, CCFLs together with the capacitors may be driven in parallel to obtain high brightness and allow the CCFLs to be utilized in a direct type backlight. Also, capacitors having capacitances that are different from those of the other capacitors are attached to both ends of a certain lamp to compensate for leakage of electricity to obtain a uniform of brightness.

It should be noted that, while 16 or 20 lamps are employed in the first and second embodiments, the number of the lamps can be changed. Even if the number of lamps are changed, if the capacitances of the capacitors Cs are selected taking into account of the parasitic capacitance between the lamp and the lamp housing 150 and the temperature convection in the lamp system, the same advantage as mentioned above can be achieved. Thus, other embodiments with different number of lamps are included in the scope of the present invention.

It will be apparent to those skilled in the art that various modifications and variations can be made in the backlight unit of the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
   a liquid crystal display panel driven in a vertically upright orientation;
   a plurality of cold cathode fluorescent lamps for emitting light to the liquid crystal display panel connected to one another in parallel;
   a plurality of high voltage capacitors respectively connected to both ends of each of the plurality of cold cathode fluorescent lamps to form qualitatively similar equivalent circuits as the external electrode fluorescent lamps; and
   a lamp housing positioned under the plurality of cold cathode fluorescent lamps and encompassing the plurality of cold cathode fluorescent lamps,
   wherein a pair of capacitors with capacitances different from those of the others of the plurality of capacitors are connected to both ends of a lowermost cold cathode fluorescent lamp arranged at a side of the lamp housing.

2. The device of claim 1, wherein the others of the plurality of capacitors are connected to both ends of each of the others of the plurality of cold cathode fluorescent lamps.

3. The device of claim 1, wherein the plurality of cold cathode fluorescent lamps are connected in parallel through the plurality of capacitors connected to both ends of each of the plurality of cold cathode fluorescent lamps.

* * * * *